(12) United States Patent
Staskiewicz et al.

(10) Patent No.: US 6,736,365 B2
(45) Date of Patent: May 18, 2004

(54) VALVE FOR USE IN PRODUCING CAST CONCRETE ARTICLES

(75) Inventors: Alma L. Staskiewicz, Mars, PA (US); William S. Long, III, Cowansville, PA (US)

(73) Assignee: Naams, LLC, Evans City, PA (US)

( * ) Notice: Subject to any disclaimer, the term of this patent is extended or adjusted under 35 U.S.C. 154(b) by 189 days.

(21) Appl. No.: 10/056,939

(22) Filed: Jan. 25, 2002

(65) Prior Publication Data

US 2002/0109068 A1 Aug. 15, 2002

Related U.S. Application Data

(63) Continuation-in-part of application No. 09/344,131, filed on Jun. 24, 1999, now Pat. No. 6,395,213.

(51) Int. Cl.[7] ................................................ F16K 5/06
(52) U.S. Cl. ..................... 249/100; 249/101; 249/109; 249/144; 264/333; 425/562
(58) Field of Search .................... 425/562; 249/100, 249/101, 109, 144; 364/333

(56) References Cited

U.S. PATENT DOCUMENTS

| | | | |
|---|---|---|---|
| 569,641 A | 10/1896 | Heckert | 249/109 |
| 627,666 A | 6/1899 | Duncan | 249/109 |
| 1,191,471 A | 7/1916 | Robinson | |
| 2,242,985 A | 5/1941 | Zeunert | 22/153 |
| 2,559,296 A | 7/1951 | Hansen | 249/100 |
| 2,823,439 A | 2/1958 | Schmidgall | 249/100 |
| 3,186,039 A | 6/1965 | Sylvester | 249/109 |
| 3,552,440 A | 1/1971 | Smith | |
| 3,648,723 A | 3/1972 | Nelson et al. | |
| 3,729,165 A | 4/1973 | Trimble | 249/144 |
| 3,942,936 A | 3/1976 | Wells et al. | 249/100 |
| 4,123,033 A | 10/1978 | Joelson | 249/100 |
| 4,133,371 A | 1/1979 | Birch et al. | 164/350 |
| 4,618,464 A | 10/1986 | Ditcher | 264/35 |
| 4,622,002 A | 11/1986 | Bormuth | 425/577 |
| 5,169,655 A | * 12/1992 | Von Holdt, Sr. | 425/562 |
| 5,229,024 A | 7/1993 | Corbin | 249/100 |
| 5,286,440 A | 2/1994 | Beacom | 249/100 |
| 5,409,654 A | 4/1995 | Platusich | 264/161 |
| 5,451,152 A | 9/1995 | Funahashi et al. | 425/85 |
| 5,503,544 A | 4/1996 | Platusich | 425/116 |
| 5,520,531 A | 5/1996 | Del Monte | 249/109 |
| 5,577,708 A | 11/1996 | Pfannenschmidt | 251/315.11 |
| 5,730,420 A | 3/1998 | Tow | 251/315.12 |
| 5,746,417 A | 5/1998 | Bowers et al. | 251/315.12 |
| 5,911,405 A | 6/1999 | Korczynski, Jr. et al. | |
| 6,039,304 A | 3/2000 | Carlson et al. | 251/209 |
| 6,253,791 B1 | 7/2001 | Miklo | 137/876 |

FOREIGN PATENT DOCUMENTS

| | | | |
|---|---|---|---|
| GB | 2081172 | 2/1982 | 249/109 |
| JP | 59229066 | 12/1984 | |

* cited by examiner

*Primary Examiner*—Tim Heitbrink
(74) *Attorney, Agent, or Firm*—Buchanan Ingersoll, P.C.

(57) ABSTRACT

A three piece full port ball valve for use with a form for producing a cast concrete article is provided wherein the housing of the valve has been modified by creating openings through the valve housing to access the flow opening in the ball member for clearing concrete slurry therefrom after the form has been filled. Additional openings in the housing at other locations can be created for cleaning around the ball member and the inside of the housing.

4 Claims, 9 Drawing Sheets

VALVE FOR USE IN PRODUCING CAST CONCRETE ARTICLES

CROSS REFERENCE TO RELATED APPLICATION

This application is a continuation-in-part of U.S. patent application Ser. No. 09/344,131, filed Jun. 24, 1999, now U.S. Pat. No. 6,395,213.

BACKGROUND OF THE INVENTION

The present invention relates to valves, and more particularly to a valve for use with a form and method for producing cast concrete articles.

Steel forms have been used for many years to cast concrete articles for making catch basins and manholes. Manholes are typically created from multiple cast concrete sections which are configured to be stacked on top of each other. Such cast concrete articles are generally required to meet certain minimum government standards relating to the strength and permeability of the concrete. Conventionally, the cast concrete articles are produced by filling a steel form, which is similar to a mold, with a wetted mixture of, for example, cement, sand, gravel and water, which is then allowed to dry and harden. The exact mixture may vary, as is well-known in the art, and may include other components such as chemical hardening agents. These steel forms typically are used to produce cast concrete articles which weigh thousands of pounds. The steel form typically has an expandable outer jacket which surrounds an inner core. The shape of the jacket generally defines the shape of the article to be cast, which typically is hollow. The space between the core and the jacket defines the cavity of the form into which the wetted concrete mixture is disposed and cured. The cavity is filled with the wet concrete through the open top of the steel form. Additionally, a top piece, called a "header," is normally employed, after the cavity is filled, to create a "tongue" on the top of the cast article which can mate with a groove in the bottom of an adjoining concrete article so that such articles may be stacked on top of each other to provide for the desired depth at which the catch basin or manhole will be installed. The groove in the bottom of the article is formed by a raised wall portion on a bottom ring member over which the steel form is positioned when it is being filled with concrete. This ring member actually forms the bottom surface of the cavity which defines the shape of the concrete article.

The conventional manner of filling the steel forms with concrete is typically both labor intensive and time consuming. In general, the mixed, still wet, concrete is transported from a mixing bin to the location of the steel form, The concrete is then typically shoveled by hand from the container in which it is transported into the steel form. Because the cavity into which the wet concrete is placed may typically be only several inches wide, the filling of the mold, in customary practice, is normally done by hand since the wet concrete must be carefully filled into the relatively narrow opening at the top of the form.

Additionally, care must be taken when filling the form to ensure that air pockets do not form in the concrete. While the form is being filled with the wet concrete, steps must be taken to ensure that the concrete settles properly and any air pockets are eliminated. The conventional manner of eliminating the air pockets is to use a vibrating device, for example a "stick vibrator." This device is inserted into the still wet concrete at various points around the cavity to vibrate the concrete to enhance settling and remove air pockets. Once this procedure has been performed, however, the cast concrete article is still not completed. Because the cast articles are typically stacked one on top of another to form the manhole, the top of the article is provided with a tongue portion which fits into a groove that is cast into the bottom of an adjoining article. The tongue is created using a header which is placed on top of the filled form. A header is an annular member, in the case of round forms, which has a smaller diameter wall portion offset from the outer edge of the header. The outside of the header is generally aligned with and rests on the top of the steel form. The wall portion creates a small, upstanding annular cavity around the inner core, which may only be a few inches wide, and which now must be filled with more wetted concrete to create the tongue. Once both the larger, main cavity and the smaller cavity are filled and vibrated, the surface of the concrete article must be finished by hand. Finally, the article is cured. Typically, the steel form containing the wetted concrete remains in place on the shop floor for sufficient time to cure, usually overnight. Once the concrete is cured, the outer portion of the steel form, which is typically an expandable outer jacket, is loosened from around the concrete article, by expanding the jacket, and then lifted off of the cast concrete article. Next, the concrete article is lifted off of the core and transported elsewhere for storage or shipping. The process described above is then repeated to produce additional cast concrete articles. However, due to the time needed to hand fill and then cure the articles, the process is typically performed during only one shift each work day.

As can be understood, the procedure just described, which is still the standard procedure carried out in the cast concrete manufacturing industry today, can be both time consuming and labor intensive. Most present day manufacturers of such cast concrete articles typically can have a number of steel forms which are simply set up in rows on the shop floor. To create the concrete articles, wetted concrete is delivered to each individual steel form which is then filled in the manner described above. Because of the procedure of bringing the wet concrete to the steel form, other disadvantages are encountered in the workplace. For example, the wet concrete is typically transported overhead by hydraulic devices mounted to the ceiling of the shop. The weight of the concrete and the overhead transport systems can therefore pose safety hazards to workers on the shop floor below. Additionally, spilled concrete both from the overhead transport system and from hand filling the steel forms creates tripping hazards and also requires time and effort to clean up the spilled concrete.

Accordingly, there is a need for an improved form and method for producing cast concrete articles which is faster, less labor intensive and also results in a safer and cleaner work environment.

SUMMARY OF THE INVENTION

A steel form according to the invention is provided which is generally completely sealed except for air vents and a fill port for pumping liquefied concrete into the form, thereby filling the form to produce cast concrete articles. The form can include a conventional, removable inner core surrounded by a modified jacket, which can also be expandable, and a bottom member, which can be attached to a pallet on which the steel form can be transported, for example, from the liquefied concrete pump to the kiln for drying. The fill port is preferably provided through the outer jacket. The normally open top of the steel form is sealed with a modified header, which can be internally configured to create a tongue for mating with a grooved adjoining cast concrete article.

The bottom member can have a raised wall portion for forming the groove in the bottom of the concrete article which can mate with the tongue portion of an adjoining concrete article. The modified header can also include the aforementioned air vents for evacuating air as the liquefied concrete is pumped into the form. The air vents can also provide visual confirmation of the form being completely filled with concrete. Braces can be provided to support the top of the modified header against pressure as the concrete is pumped into the form. Additionally, locator bolts can be provided through the modified header, to which can be attached inserts which become embedded in the cast concrete article and can be used to facilitate the securement of manhole top sections to the cast concrete article. Furthermore, the fill port can be connected to a sliding gate arrangement wherein the fill port is movable between an open position, where the fill port aligns with an opening in the outer jacket for pumping concrete thereinto, and a closed position wherein the slide gate covers the opening in the outer jacket. After the form has been filled with liquefied concrete, the slide gate can be moved to close off the opening.

Another feature of the invention can include a modified three piece full port ball valve, which can be provided in place of the sliding gate arrangement to control access to the fill port through the opening in the outer jacket.

Other details, objects, and advantages of the invention will become apparent from the following detailed description and the accompanying drawing figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN PREFERRED EMBODIMENTS

Figure 1:
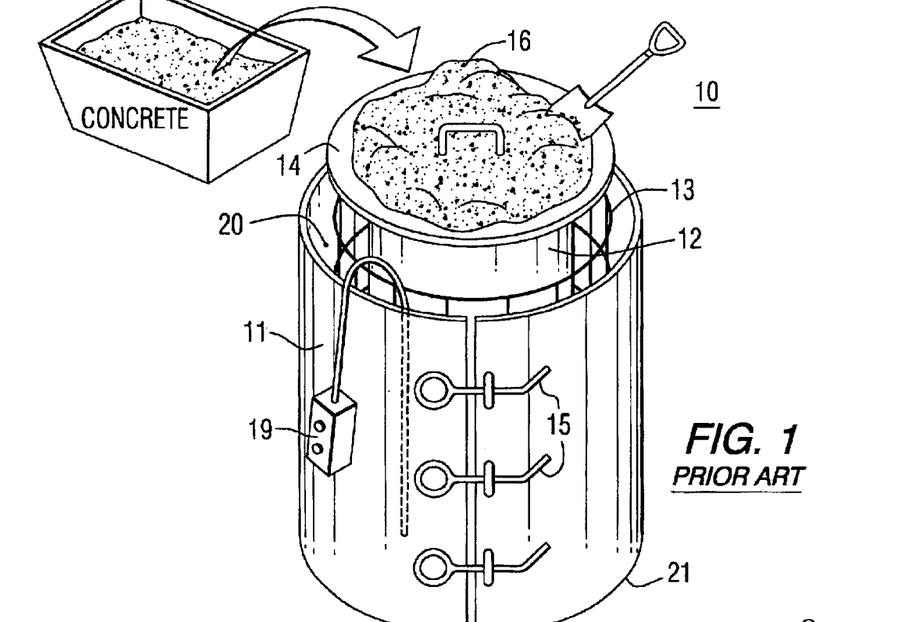
FIG. 1 shows a prior art form for producing cast concrete articles.
Figure 2:
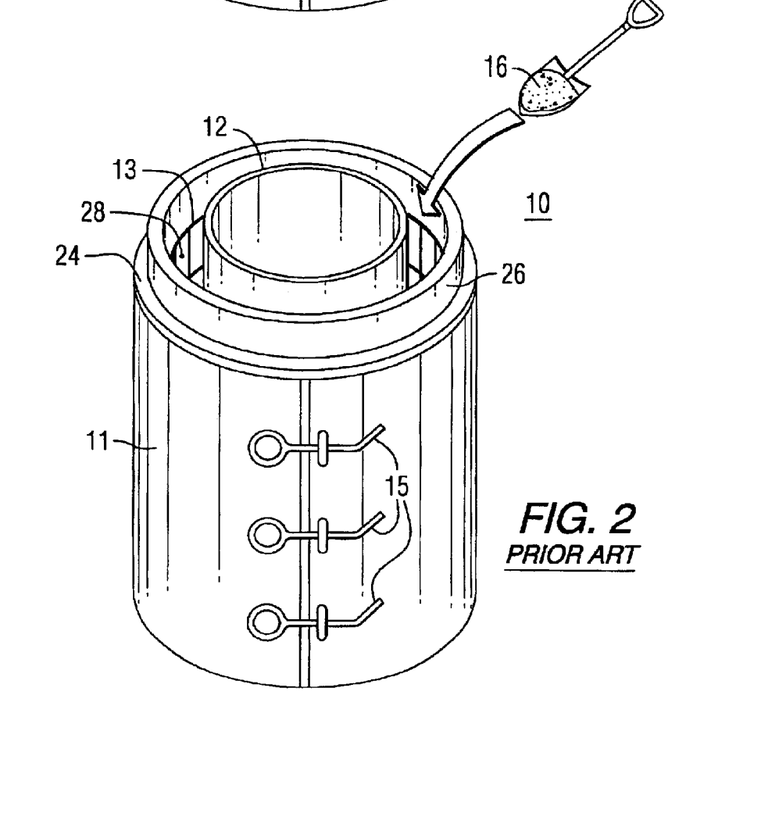
FIG. 2 is another view of the prior art form in FIG. 1 showing a conventional header attached thereto.
Figure 3:
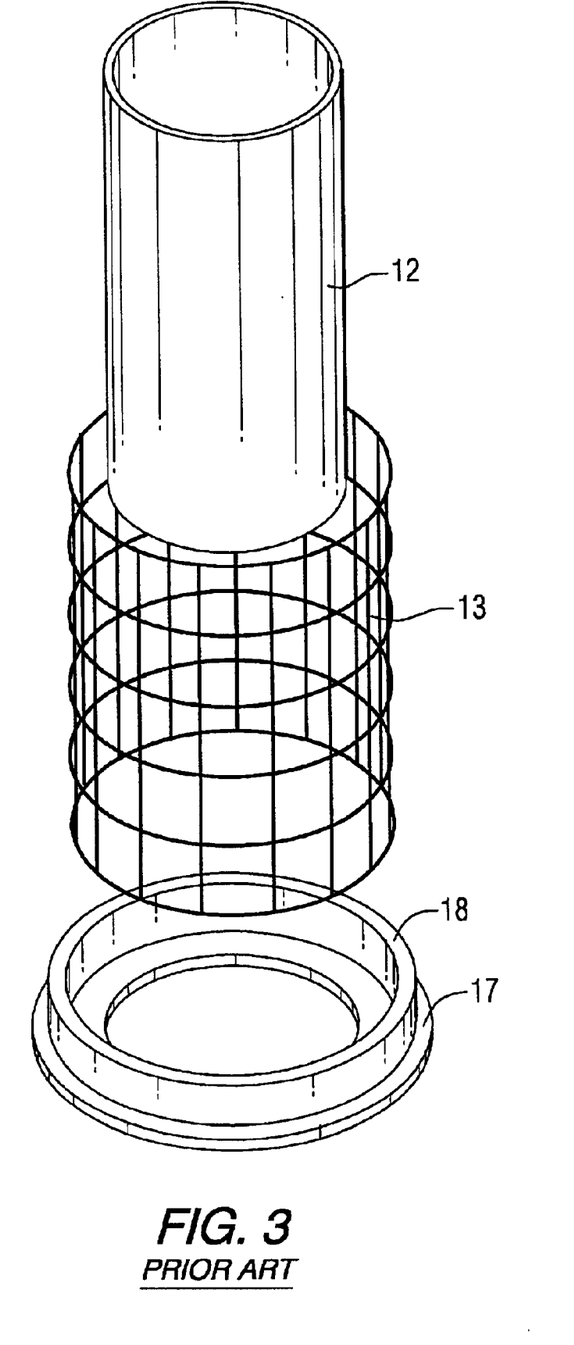
FIG. 3 illustrates a conventional inner core and surrounding reinforcement member which can be used in a form according to the invention as well as conventional prior art forms.

Referring to the drawings, wherein like reference numbers refer to like parts throughout, a prior art form 10 for producing cast concrete articles is shown in FIGS. 1 through 3. The conventional form 10 has an expandable outer jacket 11 which surrounds an inner core 12 and a concrete reinforcement screen 13 and is placed over a bottom ring member 17. The expandable outer jacket 11 surrounds the core 12 except for the top of the core 12, which extends upwardly above the expandable outer jacket 11. As shown in FIG. 3, the core 12 is itself partially surrounded by the reinforcement member 13, which, unlike the core 12, is completely enclosed in a cavity 20 of the form 10. The reinforcement member 13 is typically wire mesh which becomes embedded in the solidified concrete. The bottom ring member 17 can have a raised wall portion 18 which forms a groove in the bottom of the concrete article.

The inner core 12, the inside of the expandable jacket 11 and the bottom ring member 17 define the cavity 20 which is filled with the wetted concrete to produce the cast concrete article. To fill this cavity 20, the conventional process is to deliver concrete to the site of the concrete form 10 and dump portions of the concrete 16 onto a lid 14 which rests on the inner core 12. From this point, laborers shovel the concrete by hand into the cavity 20. Since the cavity 20 may typically be only from about 5 to about 7 inches wide, care must be taken when shoveling the concrete into the cavity 20. As the cavity 20 is being filled with concrete, it is known that air pockets can also form which, if not eliminated, can create voids that can ruin the finished concrete article. The air pockets can also create a pock-marked outer surface on the article. If large or deep enough, these pock-marks can cause the concrete article to be unacceptable and the finished article will be rejected for not meeting industry strength and permeability standards. The rejected article must then be discarded. In order to eliminate these air pockets, a stick vibrator 19 is typically used by the laborers by inserting the vibrator into the cavity 20 and vibrating the concrete 16 in order to cause it to settle, thereby eliminating such voids. The stick vibrator is used at multiple locations around the form 10 in order to ensure that substantially all air pockets are eliminated. At this point, the article is still not complete. The next step is to place what is referred to as a header 24 on top of the expandable jacket. As shown in FIG. 2, the header has an upstanding smaller diameter wall 26 which creates a smaller annular cavity 28 around the core 12. Similar to filling the main cavity 20, wet concrete 16 is shoveled into this smaller cavity 28 to create a "tongue" on the finished concrete article which is necessary to mate with the groove, formed by the raised wall portion 18 of the bottom ring member 17, in the bottom of an adjoining concrete article which will be stacked on top of the article in order to form, for example, a manhole. Once the smaller cavity 28 is filled, it too must be vibrated. Finally, the top surface of the concrete article must be hand finished by the laborers.

Typically, a number of such conventional forms 10 may be placed in rows on the shop floor of the manufacturing plant. Wet concrete is delivered to each individual form 10 which is then filled in the manner described above and allowed to cure overnight before the solidified concrete articles are removed from the forms 10. To remove the articles, clamps 15 are released to allow the expandable jacket 11 to be opened slightly to facilitate the removal of the form 10 from around the cured concrete article. Additionally, the core member 12 is typically sprayed with a release agent prior to filling the mold so that it can be easily removed, by lifting the concrete article off of the core 12 after the concrete has cured. Also, since the steel forms 10 are generally not moved from the location, the bottom ring member 17, which is not connected to anything, simply remains on the floor under the steel forms 10.

As can be imagined, the process described above is both labor intensive and time consuming. Workers are required to deliver the concrete to the site of each mold and also to shovel the concrete by hand into both the larger main cavity 20 and the smaller cavity 28 in order to fill the steel form with concrete. Additionally, stick vibrators must be used at various locations around both the main cavity 20 and the smaller cavity 28 to ensure that all air pockets are removed which could make the final product unacceptable. The wet concrete is typically vibrated when the cavities 20, 28 are substantially filled, or may be vibrated periodically as the cavities 20, 28 are being filled when larger concrete articles are being produced. Furthermore, the forms 10 remain on the shop floor to cure overnight. Typically, this process allows the plant to operate only one 8-hour shift per day thereby limiting the number of concrete articles that can be manufactured.

Figure 4:
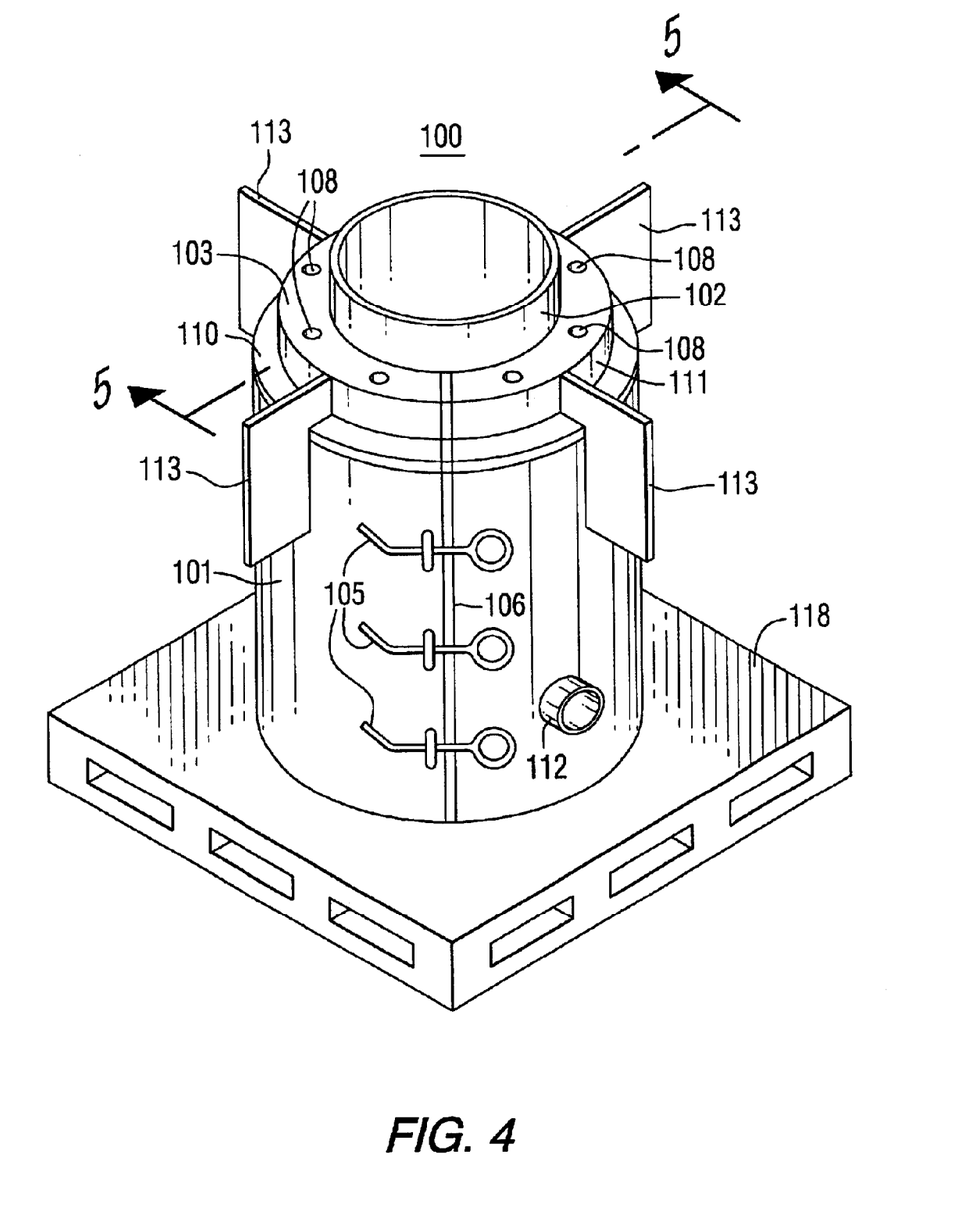
FIG. 4 shows a presently preferred embodiment of a form for producing cast concrete articles according to the invention.
Figure 5:
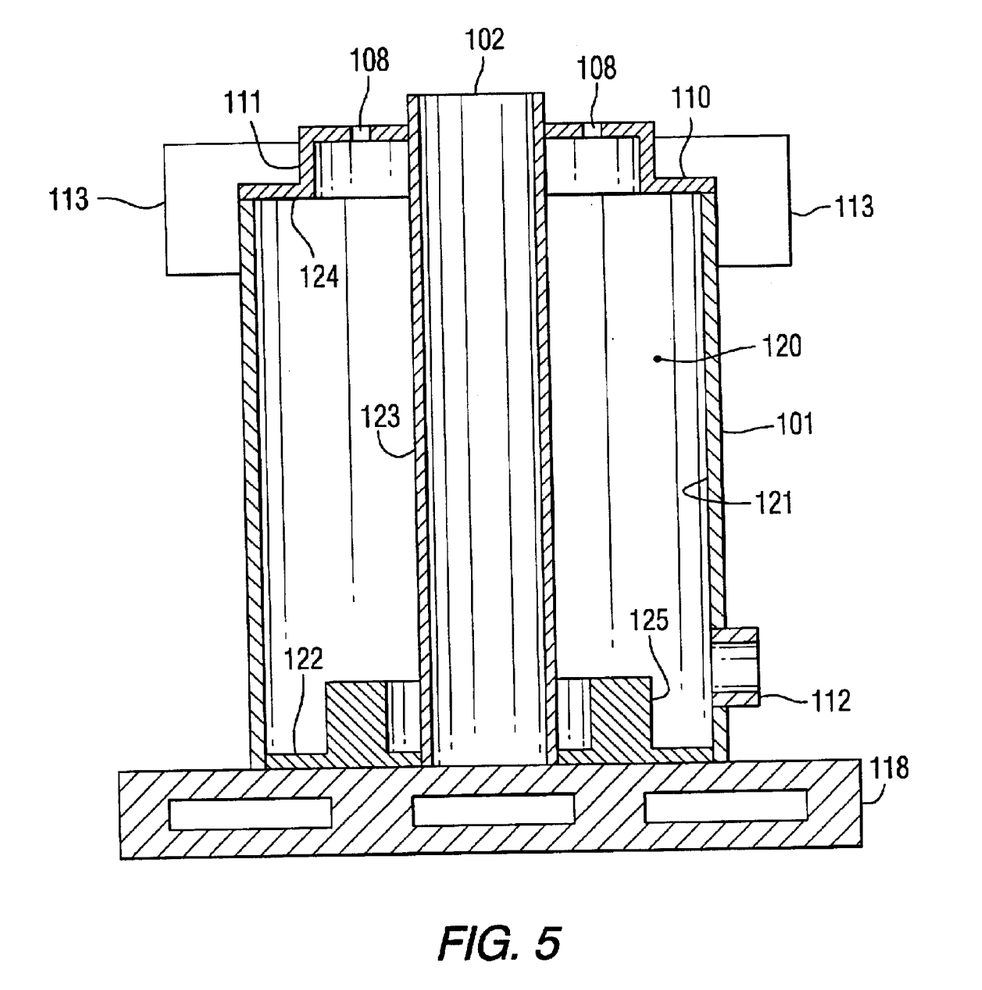
FIG. 5 is a sectional view taken along the line V—V in FIG. 4.

Referring now to FIGS. 4 and 5, there is shown a presently preferred embodiment of a form 100, typically made of steel, for use in producing cast concrete articles by pumping liquefied concrete into the form 100 according to the invention. The form 100 can include an outer jacket 101, that can be expandable, which surrounds an inner core 102 and a bottom member 122, which can be attached to a pallet 118, such as by welding, on which the form 100 is positioned for easily transporting the form 100 to various locations in the shop, such as, for example, a concrete pump to fill the cavity and a kiln area where the concrete is cured. Additionally, the form 100 can include a modified header 110 which can preferably be secured over the conventionally open end of the cavity 120 formed by the outer jacket 101 and core 102 to generally completely seal cavity 120. As shown, the header 110 has an open center through which the core 102 extends. The inner periphery of the open center of the header 110 is positioned closely adjacent the outer surface 123 of the core 102, fitting just closely enough to generally seal the cavity 120 such that liquefied concrete pumped into the cavity 120 cannot freely escape therebetween. The bottom member 122 can simply be the prior art bottom ring member 17, shown in FIG. 3.

Thus, as shown best in FIG. 5, the cavity 120 is particularly defined by the inner surface 121 of the outer jacket 101, the outer surface 123 of the core 102, the bottom member 122 and the bottom side 124 of the modified header 110.

To liquefy and condition the concrete for pumping, the following presently preferred mix design is utilized: 500 lbs. cement, 1150 lbs. sand, 900 lbs. stone, 260 lbs. water, 19 oz. FC100 and 6 oz. Polyheed 997. The FC100 and Polyheed 997 are mid-range water-reducer/accelerant with finishing properties. These latter two ingredients can be purchased from Master Builders, Inc., 23700 Chagrin Boulevard, Cleveland, Ohio 44122.

To fill the cavity 120 with concrete to manufacture the cast concrete article, a fill port 112 can be provided through the outer jacket 101 in fluid communication with the cavity 120. The liquefied concrete can be pumped into the cavity 120 through the fill port 112 to produce the cast concrete article. A presently preferred pump is a skid mounted pump having a 60 horsepower electric motor, 440V 3-phase, with a 5 inch discharge outlet that pumps about 30 yards of concrete per hour at a nominal pressure of 750 psi, Preferably, the fill port 112 is provided through the outer jacket 101 near, but not necessarily right at, the bottom surface of the outer jacket 101 so that the cavity 120 generally fills from the bottom to the top thereby permitting air to escape upwardly through vents 108, sometimes called "weep" ports, which are preferably provided at or near the top of the cavity 120. Since the liquefied concrete is pumped into the cavity from the bottom, substantially no air becomes trapped in the concrete, as compared to the prior art where the concrete is filled into the cavity 20 from the top. The air in the cavity 120 can escape through the vents 108 at the top of the cavity 120 as it is being filled with the liquefied concrete. Consequently, air pockets which can create internal voids and surface "pock marks" in the cured concrete article, are substantially avoided, thereby eliminating the need to use a vibrating device, such as the stick vibrator 19 in FIG. 1, when the wet concrete is being filled into the cavity 20 by hand. Although a single fill port 112 is illustrated, it is to be understood that multiple ports, at different locations around the form 100, could be also used depending on the shape and size of the particular form employed.

The modified header 110 can be integrally formed with, or permanently attached, for example by welding, to the top of the outer jacket 101, since it typically would never need to be removed. If not permanently attached, it would be necessary to firmly secure the header 110 to the top of the outer jacket 101 when filling the cavity 120 with concrete. Additionally, portions of the outer jacket 101 and the header 110 can be configured in various manners, such as the raised wall portion 125 on the bottom surface 123 and the raised smaller diameter upstanding wall portion 111 of the header 110, to further define the shape of the cavity, and thus the article to be cast therein. The smaller diameter upstanding wall portion 111 of the header 110 can be provided to create a tongue portion on the concrete article cast in the cavity 120 so that an upper adjoining cast concrete article, which has a grooved bottom, can be mated with and stacked thereon to provide a manhole of the desired depth. Correspondingly, the bottom member 122 can be configured with a raised wall portion 125 to create the groove on the bottom of a concrete article cast in the cavity 120 to mate with the tongue on the top of a similar adjoining concrete article so that multiple such articles can be stacked on top of each other to create a manhole of the desired depth.

Moreover, the bottom member 122 can be attached to the pallet 118 because the form 100 will normally always be supported on the pallet 118, due to the preferred manner of producing concrete articles using the form 100 according to the invention. For example, the form 100 can be transported, on the pallet 118, for example, by a fork lift, to the pump where it is filled with the liquefied concrete. From there, the filled form 100 can be transported by a fork lift, again on the pallet 118, to a kiln area where the concrete is cured. Then, after curing, the concrete article can be removed from the form 100 and the form 100 can be reused by transporting it, once again on the pallet 118, back to the pump to repeat the process.

Multiple air vents 108, can preferably be provided at or near the uppermost portion of the modified header 110 to permit air to be evacuated from the cavity 120 as it fills with liquefied concrete pumped in through the fill port 112. Additionally, structural support braces 113 can be provided to strengthen the header 110 against deflection forces resulting from the pressure created by pumping the liquid concrete into the cavity 120, thereby preventing the header from being deflected outwardly at the unsupported inner periphery thereof which is adjacent the core 102. As shown in FIG. 5, the inner periphery is not otherwise supported and simply overhangs the cavity 120 adjacent the core 102. Without the support braces 113, the header can tend to flex under the pressure generated by pumping concrete into the cavity 120. However, it is to be understood that other structural enhancements could be satisfactorily employed to otherwise sufficiently strengthen the header 110 without necessarily using the braces 113 as shown in the drawing figures.

Because of the increased speed of filling the form 100 by pumping in liquefied concrete, a more efficient manufacturing process is engendered. In particular, each form 100 is transported to the pump which can fill the cavity 120 with liquefied concrete in a matter of minutes. Once filled, the form 100 is transported on the pallet 118 to a drying area, or kiln, where it can be cured at an accelerated rate, in contrast to the conventional practice of allowing the concrete to cure overnight. As soon as one form 100 is filled and moved to the kiln, another form 100 is brought to the pump and quickly filled and then transported to the kiln.

After curing, the cast concrete article is removed from the form 100 and transported to a storage or shipping area. Thereafter, the empty form 100 is returned to the pump for refilling with liquefied concrete and the cycle is repeated as long as more articles are desired to be produced. In this manner, a large number of cast concrete articles can be more quickly and efficiently produced, in an assembly-line like manner. In fact, because of the increased speed with which the forms 100 can be filled, and the accelerated curing of the concrete in kilns, the cast concrete articles could be produced virtually continuously by using two, or even three, work shifts each day. Thus, the form 100 according to the invention makes possible more efficient and increased production of cast concrete articles than heretofore achieved in the industry. In particular, the procedure eliminates the need to vibrate the wet concrete, hand finish the surface, or provide rows of forms on the manufacturing plant floor, as is done in the conventional manner. Additionally, this improved procedure creates a cleaner and safer work environment and results in less waste.

Figure 6:
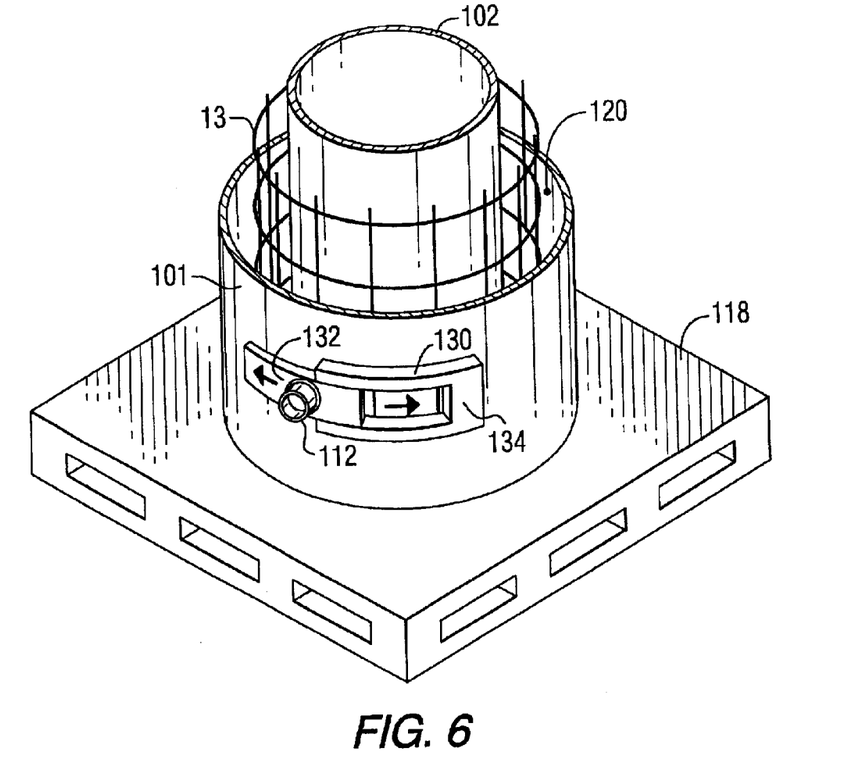
FIG. 6 is a view, partially in section, of a second presently preferred embodiment of a form having a slide-gate fill port arrangement.

Although many fill port 112 configurations controllable between open and closed positions can be designed within the skill of ordinary artisans, a presently preferred slide gate assembly 130 is shown in FIG. 6. In this configuration, the fill port 112 is integral with the slide gate assembly 130 having a slide plate member 132 which is slidably received in a slotted member 134 attached to the outer jacket 101. The slide plate 132 is movable generally between two positions. In one position, for example the left position, the fill port 112 can align with an opening provided through the outer jacket 101 into the cavity 120. In this position, liquefied concrete can be pumped through the fill port 112 into the cavity 120 to produce the cast concrete article. In the other position, for example the right position, the opening into the cavity 120 is closed off by the end of the slide plate 132.

Figure 7:
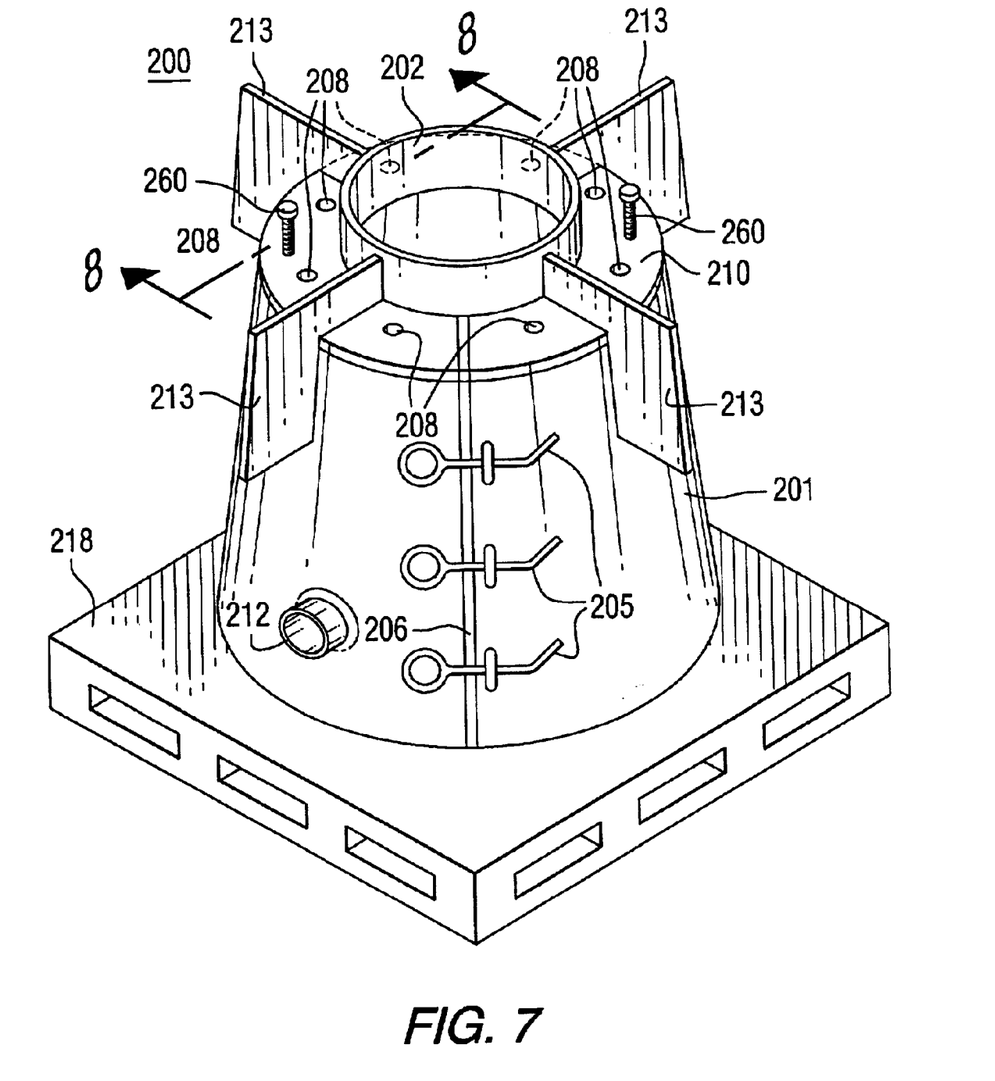
FIG. 7 shows a presently preferred embodiment of an alternate form for producing cast concrete articles according to the invention.

The shape of the form illustrated in FIGS. 4 and 5 is only one example of different shapes the steel forms may take. The generally cylindrical forms 100 shown in those figures are used to create the body of a manhole. An alternatively shaped form 200 is shown in FIG. 7, which is typically the upper most section of the manhole onto which a manhole cover member is positioned. Form 200 can be similarly supported on a pallet 218 as with form 100. In the case of form 200 shown, the header 210 is configured differently because no tongue portion is provided on this section of the manhole. Another different feature of the form 200 can be the inclusion of alignment members 260 which are provided through the header 210 and extend into the cavity 220. As shown, these alignment members 260 can simply be bolts, or threaded rods, which project into the cavity 220 and onto the ends of which inserts 262 can be removably attached. These inserts 262 are commonly employed to conveniently align with manhole cover fasteners to attach the manhole cover member to the concrete article. The inserts 262 are threaded onto the alignment members 260 prior to filling the cavity with liquid concrete through a fill port 212. After the concrete cures, the alignment members 260 can be unthreaded from the inserts 262, leaving the inserts 262 embedded in the cured concrete article for the manhole cover fasteners to be aligned with and threaded therein.

Forms 100, 200 for producing two differently shaped concrete articles have been shown for convenience of illustrating the invention. However, it is to be understood that forms having various other shapes are within the scope of the invention, such as, for example, rectangular forms for manufacturing catch basins. Importantly, the particular shape of the form is not essential and the invention is therefore not to be limited thereby. As is apparent from the preceding description, any article cast from concrete is susceptible to production using forms according to the invention as described above, as well as any of the methods described hereinafter for producing such articles.

A presently preferred method of producing cast concrete articles can, in its most basic form, include the following steps: (1) providing an outer jacket 101; (2) inserting a core 102 in the outer jacket 101 such that the core 102 is at least partly enclosed therewithin; (3) placing the outer jacket 101 and core 102 adjacent a bottom member 122; and (4) attaching a header 110 atop the outer jacket 101, thereby (5) defining a cavity 120 having the shape of the concrete article to be cast therein, wherein the cavity 120 is defined by inner surface 121 of the outer jacket 101, an outer surface 123 of the core 102, the bottom member 122 and a bottom side 124 of the header; (6) filling the cavity 120 by pumping concrete into the cavity 120 through a fill port 112 provided through the outer jacket 101; and (7) venting the cavity 120 so that as the cavity 120 is filled with concrete, air is evacuated from the cavity 120 through vents 108.

Additionally, the preferred method can include the further steps of (8) filling the cavity 120 from the bottom by locating the fill port 112 near the bottom of the cavity 120 so that the liquefied concrete flows to the top and (9) venting the top-most part of the cavity 120 by providing vents 108 in the top of the header 110 so that as the cavity 120 is filled from the bottom, trapped air is efficiently evacuated through the weep ports 108 by the rising level of liquefied concrete as the cavity 120 is filled. This elimination of trapped air avoids the creation of air pockets thereby improving the quality of the finished product by eliminating internal and surface voids, and also providing a smoother surface finish.

Further presently preferred steps can include (10) permanently attaching the header 110 atop the outer jacket 101 such that said header 110 and said outer jacket 101 form an integral unit which completely encloses the core 120, and (11) bracing the header 110 with strengthening members so that the top of the header 110 is supported against deflection forces resulting from pressure generated when liquefied concrete is pumped into the cavity 120 through the fill port 112 and (12) attaching the bottom member 122 to a pallet 118.

Additional preferred steps can include (13) configuring the header 110 with an upstanding wall portion 111 which further defines the shape of the cavity 120 such that a tongue is provided on an upper part of a concrete article cast in the cavity 120. Likewise, a corresponding step can include (14) configuring the bottom member 122 with a raised wall portion 125 which also further defines the shape of the cavity 120 such that a groove is provided in a lower surface of a concrete article cast in the cavity. The groove is adapted to receive the aforementioned tongue of an adjoining cast concrete article which can be stacked thereon to provide a manhole having the desired depth.

Moreover, other steps in the preferred method can be included depending on the particular concrete article to be produced. One example is the form 200, shown in FIGS. 7-8, which can typically be used to produce the top most concrete member of a manhole. To produce this particular concrete article, additional presently preferred steps can include: (A) providing an alignment member 260 attached to the top of the header 210 such that one end of the alignment member 260 projects through the header 210 into the cavity 220; and (B) removably attaching an insert 262 onto the end of the alignment member 260 which extends into the cavity 220, whereby, the insert 262 is captured in the concrete when the cavity is filled therewith. The alignment member 260 can then be detached from the insert 262 thus leaving the insert 262 embedded in the solidified concrete. The insert 262, which is well know to those skilled in the art, is typically employed to easily and conveniently align with and connect to fasteners on a manhole cover member which is typically secured atop the upper most concrete article of the manhole.

Additional steps aimed at increasing production using the forms 100, 200 include (1) serially transporting each form 100, 200 via the pallets 118, 218 to the pump for filling with concrete; (2) immediately transporting the filled form 100, 200 from the pump to the drying area; (3) removing the cured concrete article from the form 100, 200; (4) transporting the cast concrete article to a storage area; and (5) recycling the form 100, 200 to the pump for refilling with concrete thus repeating the cycle, which can continue indefinitely in an assembly-line like fashion.

As can now be appreciated in view of the prior manner of producing cast concrete articles, the production methods provided according to the invention make possible more efficient and increased production of cast concrete articles than heretofore achieved in the industry. In particular, these methods eliminate filling the cavity by hand, vibrating the wet concrete and hand finishing the surface. The elimination of these steps greatly enhances the efficiency of the production process and significantly reduces production costs. Other benefits naturally resulting from these methods include a cleaner and safer work environment and less waste of materials.

Figure 9:
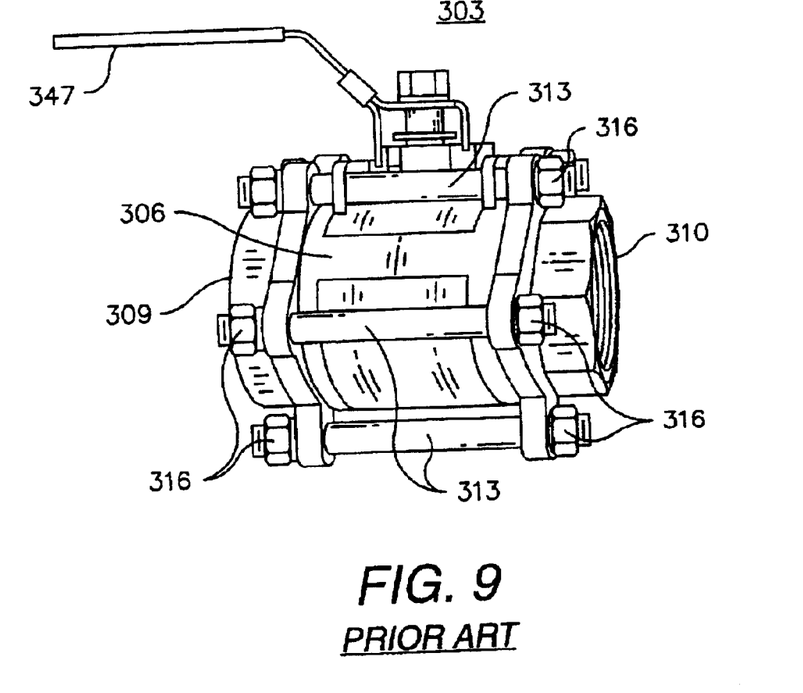
FIG. 9 shows a prior art three piece full port ball valve.
Figure 10:
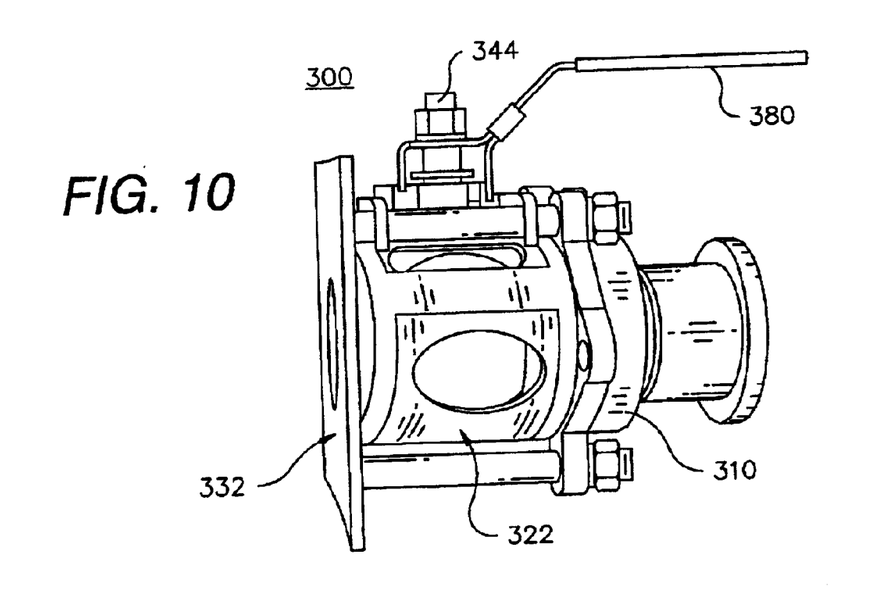
FIG. 10 shows a presently preferred embodiment of a three piece full port ball valve according to the invention.
Figure 11:
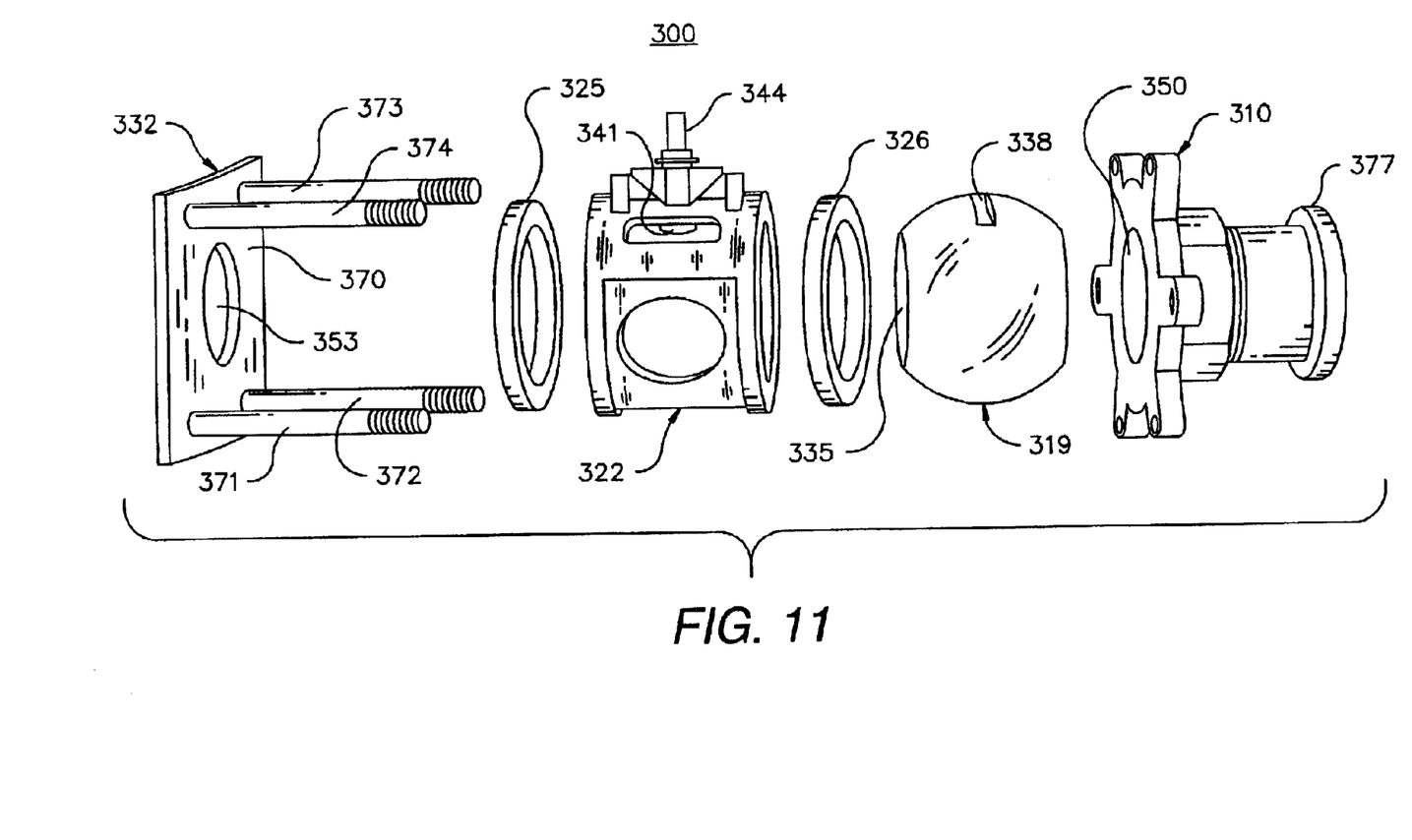
FIG. 11 is an exploded view of the valve shown in FIG. 10.

Referring now to FIGS. 9 through 13, a presently preferred embodiment of the invention can include a specially configured three piece full port ball valve 300, shown in FIG. 10, which can be made, for example, by modifying a conventionally available three piece full port ball valve 303, shown in FIG. 9. The prior art three piece full port ball valve 303 illustrates some of the standard parts of the valve 303, including the housing 306 and threaded end portions 309, 310 which are connected at either end of the housing 300 via studs 313 and nuts 316. Other standard components of a three piece full port ball valve 303 can be better seen in FIG. 11, which is an exploded view of a presently preferred embodiment of a modified three piece full port ball valve 300. As shown, a standard ball member 319 is contained within a modified housing 322 between a pair of conventional bushings 325, 326 which locate and generally seal around the standard ball member 319, between one conventional end portion 310 and one modified end portion 332 The standard ball member 319 has a hole 335 through the center which permits flow through the modified valve 300. The ball member 319 is rotatable between open and closed positions via a slot 338 in the top of the ball member 319. As shown best in FIG. 13, a key member 341 extends through the top of the modified housing 322 and is configured to engage the slot 338 in the top of the ball member 319 for rotating the ball member 319 between open and closed portions. The key 341 is connected to a shaft 344 which projects through the top of the modified housing 322 for engagement by a handle 380, shown in FIG. 10, which provides leverage to rotate the ball member 319. The slotted ball member 319, key 341, and shaft 344 are all standard, unmodified components of the conventional three piece valve, such as the valve 303 in FIG. 9. The bail member 319 is rotatable to align the hole 335 through the ball member 319 with the holes through the standard end portion 310 and the modified end portion 332 to permit flow through the modified ball valve 300. The ball member 319 can be rotated 90 degrees to the closed position, at which point the hole 335 is not aligned with the holes 350, 353 through the end portions 310, 332 thus blocking flow through the modified ball valve 300.

Figure 12:
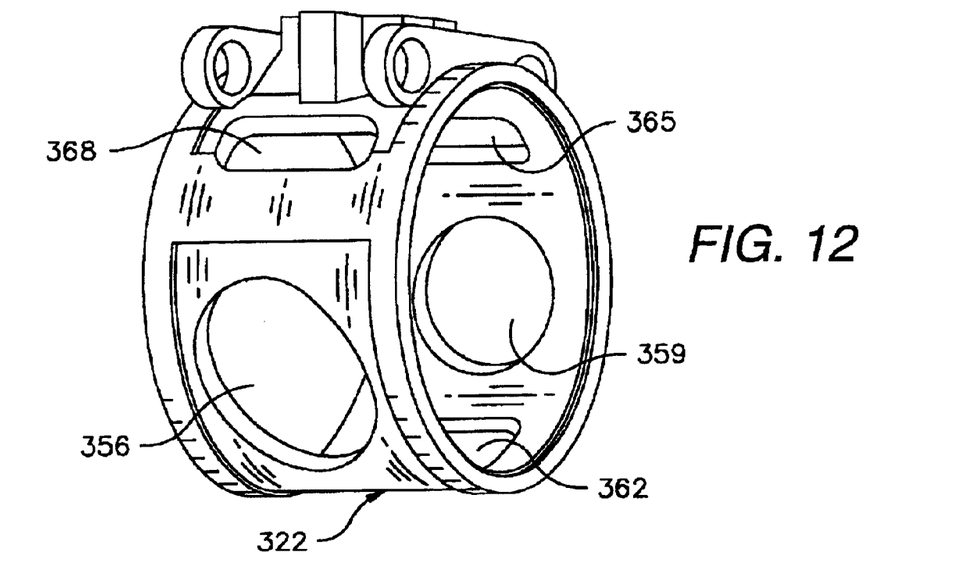
FIG. 12 is a perspective view of the housing of the valve shown in FIG. 10.
Figure 13:
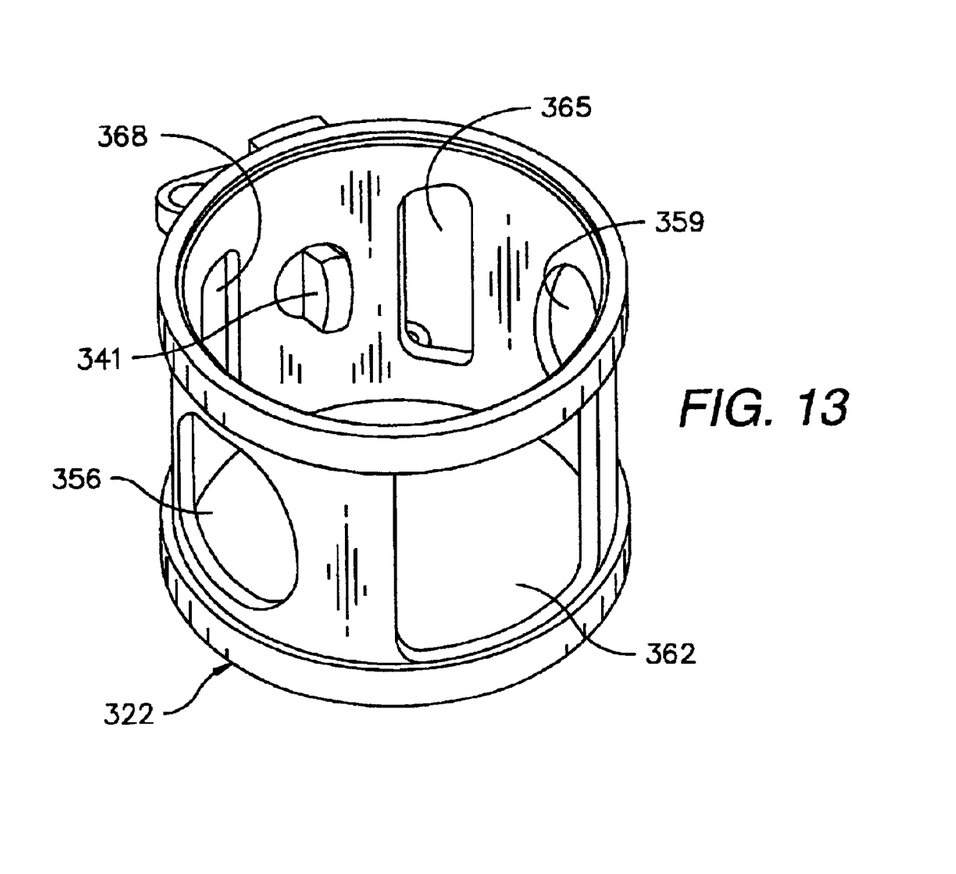
FIG. 13 is a perspective view of the housing shown in FIG. 10 taken from a different angle than in FIG. 12.

According to a presently preferred embodiment of the invention, and as shown best in FIGS. 12 and 13, the conventional ball valve 303 can be modified by creating openings through the sides of the modified housing 322. A first pair of openings 356, 359 can be created through opposite sides of the modified housing 322 in a manner designed to align with the hole 335 through the ball member 319 when the ball member 319 has been rotated 90 degrees, i.e., to the closed position of the modified ball valve 300. The openings 356, 359 through the housing 322 permit access to the hole 335 in the ball member 319. Since the flow being conducted through the modified ball valve 300 is a slurry of cement, a plug of slurry will be captured in the hole 335 in the ball member 319 when the ball member 319 is rotated 90 degrees to close the valve 300. If not cleared out, this plug of cementitous material will harden in the hole 335 in the ball member 319, which will render the valve 300 unusable unless and until the plug is removed This first set of openings 356, 359 through the housing 332 can be provided so that when the ball member 319 is rotated to close the valve 300, the plug of slurry can be easily removed, for example, by spraying water through the hole 335 in the ball member 319 via the openings 356, 359 created in the housing 322 to wash out any excess slurry. Without the openings 356, 359 through the housing 322, the valve 300 would have to be disassembled in order to access the hole 335 in ball member 319 to clear out the plug of slurry. Clearly, having to disassemble the valve 300 after filling the form each time would be very inefficient.

Figure 8:
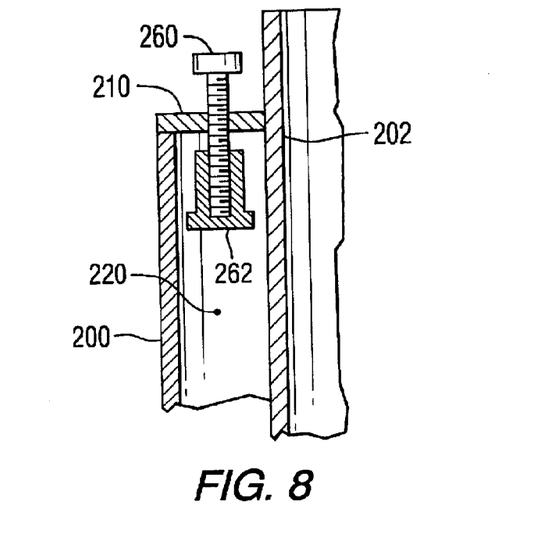
FIG. 8 is a sectional view taken along the line VIII—VIII in FIG. 7.

Additional openings 362, 365, 368 in the modified housing 322 can also be provided for cleaning away any excess slurry which may leak around the bushings 325, 326 during filling of the form. Other modifications can include replacing one conventional end portion, for example left portion 309, with modified end portion 353, which is designed to be connected to the form 100, 200 in communication with the opening in the outer jacket and the inlet to the mold cavity. Specifically, the modified end portion 353 can be connected to, or over top of, the fill port 112, 212 of the form 100, 200. The modified end portion 353 can be a plate member 370 to which four studs 371–374 are mounted. The studs 371–374 can connect in a conventional manner to a standard end portion 310 at the other end of the modified ball valve 300 to hold the ball member 319 and the modified housing 322 therebetween, similarly to the conventional valve 303. Like the conventional end portion 309 it replaces, a hole 353 through the plate member 370 permits flow through the modified end portion 353, and thus the valve 300. The modified end portion 353 can be attached to the form 100, 200, for example, by welding the plate member 370 to the outer jacket 101, 201 over the fill port 112, 212. Additionally, to the extent that the fill port 112, 212 is shown in FIGS. 4, 6, and 8 as projecting slightly outward from the outer jacket 101, 201, it may be made flush with the outer jacket 101, 201 such that no portion extends into the modified valve 300 through the modified end portion 353. The plate member 370 can have a curvature to match the curvature of the outer jacket 101, 201. Generally, the modified valve 300 can preferably be permanently attached to the form 100, 200. An inlet member 377, can be adapted for quick connection/release to a pump used to fill the form with concrete slurry. The inlet member 377 can be connected via threads to the threaded conventional end portion 310.

As an alternative manner of attaching the modified valve 300 to the form 100, 200, the fill port 112, 212 could be permitted to extend sufficiently from the outer jacket 101, 102 such that the end of the fill port 112, 212 could be adapted to connect to the standard, unmodified end portion 309 of the ball valve 303. This could be accomplished utilizing a conventional manner of attachment, for example by providing external threads on the fill port 112, 212, such that the conventional end 309 of the ball valve 303 could simply be threaded onto the fill port 112, 212.

Other modifications provided for the modified ball valve 300 can include a longer handle 380 for engaging the keyed shaft 344 which rotates the ball member 319. The handle 380 can be longer than the standard handle 347 to provide greater torque for more easily closing the valve 300 after the form is filled. Extra torque can be desirable since particulates in the cement slurry being pumped through the valve can leak out between the ball member 319 and the bushings 325, 326, thus making it difficult to rotate the ball member 319.

The modified three piece ball valve 300 can be permanently connected to the form 100, 200 via the modified end portion 353, which, as described above, can be welded or otherwise connected to the outer jacket 101, 201, and releasably connected to a pump via inlet member 377. The modified three piece ball valve 300 can be easily operated via handle 380 to control the flow of slurry into the form. After the form is filled, the ball member 319 can be rotated 90° to shut off the flow of slurry and to permit slurry to be cleaned out of the hole 335 in the ball member 319 via the openings 356, 359 through the sides of the modified housing 322. Any other excess slurry can also be cleared away via openings 362, 365 and 368 in the sides of the modified housing 322. Thus, once the concrete in the mold has been cured and removed, the modified valve 300 is ready to be used to fill the form again.

Accordingly, although certain presently preferred embodiments of the invention have been described in detail herein, it will be appreciated by those skilled in the art that various modifications to those details could be developed in light of the overall teaching of the disclosure. Consequently, the particular embodiments disclosed herein are intended to be illustrative only and not limiting to the scope of the invention which is to be awarded the full breadth of the following claims and any and all embodiments thereof.

What is claimed is:

1. A valve for use with a form for producing a cast concrete article, said valve comprising:

a. a housing having first and second end portions, said first end portion communicable with a mold cavity, said second end portion communicable with a source of liquefied concrete;

b. a ball member enclosed within said housing between said first and second end portions, said ball member and each of said first and second end portions having a hole therethrough, said ball member rotatable between open and closed positions, said hole in said ball member aligning with said hole in said first and second end portions in said open position to permit said liquefied concreted to be delivered into said mold cavity, and said hole in said ball generally perpendicular to said hole in each of said first and second end portions in said closed position;

c. a bushing member intermediate said ball member and each of said first and second end portions, said bushing member supporting said ball member between each of said first and second end portions, said bushing member defining a space between said housing and an outer surface of said ball member; and d. said housing having openings created through opposing side walls thereof such that said openings align with said hole in said ball member when said ball member is rotated to said closed position such that said hole in said ball member is accessible without disassembling said valve, said openings further resulting in said space between said housing and said outer surface of said ball member being accessible without disassembling said valve.

2. The valve of claim 1 further comprising at least one additional opening created though a side of said housing.

3. A form for producing a cast concrete article comprising:

a. a core having an outer surface;

b. an outer jacket having an upper opening and a lower opening, said outer jacket at least partially surrounding said core, said outer jacket spaced apart from said outer surface of said core;

c. a header adjacent said upper opening of said outer jacket;

d. a bottom member adjacent said lower opening of said outer jacket;

e. said outer surface of said core, said outer jacket, said bottom member and said header defining a generally closed cavity having the shape of the concrete article to be cast therein;

f. a fill port communicating with said closed cavity for filling said closed cavity with concrete;

g. at least one vent in said header communicating said closed cavity with the atmosphere to at least one of release trapped air therethrough as said closed cavity is filled with concrete, and provide visual confirmation of said closed cavity being filled with concrete as evidenced by concrete exuding therethrough;

h. an opening through said outer jacket, said opening communicating with said closed cavity;

i. said fill port communicating with said opening such that said closed cavity is filled with concrete while said header is attached to said outer jacket;

j. wherein said closed cavity is filled up to said header such that the shape of a top portion of the cast concrete article is defined by said header; and k. a valve in communication with said fill port, said valve having:
  i. a housing with first and second end portions said first end portion communicable with said closed cavity, said second end portion communicable with said fill port;
  ii. a ball member enclosed within said housing between said first and second end portions, said ball member and each of said first and second end portions having a hole therethrough, said ball member rotatable between open and closed positions, said hole in said ball member aligning with said hole in said first and second end portions in said open position, and said hole in said ball generally perpendicular to said hole in each of said first and second end portions in said closed position;
  iii. a bushing member intermediate said ball member and each of said first and second end portions, said bushing member supporting said ball member between each of said first and second end portions, said bushing member defining a space between said housing and an outer surface of said ball member; and
  iv. said housing having an openings created through opposing side walls thereof such that said openings align with said hole in said ball member when said ball member is rotated to said closed position to provide access to said hole in said ball member without disassembling said valve, said openings further resulting in said space between said housing and said outer surface of said ball member being accessible without disassembling said valve.

4. The form of claim 3 further comprising at least one additional opening created though a side of said housing of said valve.

* * * * *